United States Patent [19]

O'Sullivan

[11] Patent Number: 4,797,297

[45] Date of Patent: Jan. 10, 1989

[54] PROCESSING OF SUGAR CANE PRODUCT AND DRIED PRODUCT OBTAINED THEREFROM

[76] Inventor: Mark H. O'Sullivan, 32 Lambert Road, Indooroopilly, Queensland, Australia

[21] Appl. No.: 901,271

[22] Filed: Aug. 27, 1986

[30] Foreign Application Priority Data

Sep. 2, 1985 [AU] Australia .............................. PH2229
Sep. 16, 1985 [AU] Australia .............................. PH2446
Apr. 14, 1986 [AU] Australia .............................. PH5446
Jun. 26, 1986 [AU] Australia .............................. PH6562

[51] Int. Cl.$^4$ ................................................. A23L 1/10
[52] U.S. Cl. .................................... 426/483; 426/481; 426/520; 426/635; 426/807
[58] Field of Search .................... 426/69, 481–483, 426/635, 636, 657, 807

[56] References Cited

U.S. PATENT DOCUMENTS 2,888,348  5/1959  Fuentes ................................ 426/807
3,796,809  3/1974  Miller et al. ........................... 426/69
3,939,286  2/1976  Jelks ..................................... 426/635

Primary Examiner—R. B. Penland
Attorney, Agent, or Firm—John P. White; John J. Santalone

[57] ABSTRACT

A process for the solid phase fractionation of sugar cane into three fractions comprising a fibrous fraction derived from the fibrous sclerenchyma cells from the rind of the cane, a fibrous fraction derived from the fibrous sclerenchyma cells of the fibrovascular bundles of the cane and a non-fibrous fraction derived from the parenchyma cells of the cane. The process comprises the steps of (a) subjecting pieces of the cane to a disintegrating force to cause a physical separation of the fibrous sclerenchyma cells from the non-fibrous parenchyma cells, (b) drying the sugar cane material, and (c) separating the sugar cane into the aforementioned three fractions.

The dried non-fibrous fraction has utility, inter alia, as an animal feedstuff.

7 Claims, No Drawings

PROCESSING OF SUGAR CANE PRODUCT AND DRIED PRODUCT OBTAINED THEREFROM

TECHNICAL FIELD

The present invention relates to a process for the separation of sugar cane into a plurality of solid phase fractions and to a novel product obtained by the fractionation of sugar cane. Some of such fractions have utility, inter alia, as stockfeeds.

BACKGROUND ART

Sugar cane is one of the worlds most efficient converters of solar energy to plant material or bio-mass. Sugar cane is rated at nearly 3% efficiency of solar capture. This compares with lucerne which has an efficiency of about 0.8% and maize which has an efficiency of less than 0.5%.

In many of the tropical countries of the world there is a shortage of dietary protein. This lack of dietary protein can be traced to the lack of suitable feedstuffs for both monogastric and ruminant animals. In temperate parts of the world such animals are fed, in large part, grains which grow well in temperate climates. Sugar cane is extensively grown in tropical areas of the world and it would seem logical to utilize this material as a feedstuff for animals to increase available dietary protein in these areas. Therehave been a number of studies made seeking to utilize whole sugar cane or parts thereof as a feedstuff for animals. This imperative to utilize sugar cane for a purpose other than the production of refined sugar is increased as many tropical countries are in the odious position of sugar cane being their primary export, and therefore foreign exchange earner, in a world market which is saturated with the product. The market for sugar has also been reduced by the greater use of sugars derived from corn.

Unfortunately it has been found that the high fibre content of sugar cane constrains the level of production that can be achieved in ruminant animals, particularly milk yield. This is due to the fact that in fermentative digestion, as occurs in ruminants, the presence of a high sugar content in the diet restricts fibre digestion and so the high fibre levels limits the productivity that can be achieved. The high fibre content of sugar cane makes it even less acceptable for monogastric animals whicn cannot digest cellulosic materials.

Considerable research has been conducted in ways of overcoming the deficiencies of sugar cane as an animal feedstuff. Basically these prior art processes fall into three categories, viz:

(a) supplementing whole cane with additives, (b) utilizing a liquid fraction obtained from sugar cane such as cane juice or first molasses, and (c) using the whole sugar cane pith merely separated from the rind of the cane.

The first of these strategies is exemplified by an article by William S. Russell, "Sugarcane Pelletizing Plant", The Sugar Journal, January 1974, page 22. This article describes a plant which comminutes and dries whole sugar cane including, if desired, tops, leaf and dried trash. Once the cane is dried and in a semi-meal form additives such as molasses, and other materials designed to increase the protein content or to correct mineral deficiencies, are blended into the dried cane.

It should also be noted that high fibre diets generate more heat when metabolized in the animal which exacerbates the problem of animal raising under high environmental temperatures.

The second strategy is exemplified by "Intensive Beef Production" T. R. Preston and M. B. Willis, Pergamon Press, London 1970 and "Sugar Cane Juice as an Energy Source for Fattening Pigs" A. Mena, R. Elliott and T. R. Presron, Tropical Animal Production 1981, 6:338–344. These references respectively report the feeding of liquid fractions of sugar cane to ruminant and non-ruminant animals. The problems associated with this approach are outlined in "Guidelines for Pig and Poultry Production in the Tropics using Locally Available Resources" R. T. Preston, in press, wherein it is pointed out that due to the high water content of liquid fractions of sugar cane transporting the foodstuff over more than nominal distances is uneconomic, that the shelf life of the feed is short and that it is often not convenient to incorporate high-moisture feeds in large scale livestock installations which usually are designed to use dry feeds. It should also be noted that poultry are not well adapted to liquid diets in any case. It goes without saying that in almost no circumstances is it economical to dehydrate such feeds. In the case of molasses it is believed that the high concentration of soluble mineral matter of molasses (10–12% in final molasses) causes the "physiological" diarrhoea which occurs when the level of final molasses exceeds 30 to 50% in pigs. The laxative effects when final molasses is fed at high levels also depresses feed intake in pigs and poultry and causes "stress" in poultry due to the molasses sticking to the plumage. The use of high test, or integral, molasses, which is prepared from the extracted juice of sugar cane which has been clarified and partially hydrolyzed to glucose and galactose to avoid the crystallization of sugar, is that the juice must be concentrated to 75° Brix to stop fermentation. This concentration step is very energy consumptive and renders the process uneconomic.

The third of the major known strategies is exemplified by an article by W. J. Pidgin entitled "Derinded Sugarcane as an Animal Feed—A Major Breakthrough", World Animal Review 1974, Vol. II, page 1. This article describes a machine called a cane separator which splits the cane longitudinally and separates the soft sugar pith from the rind. The derinded material is called "Comfith" and comprises the sugar storage cells and the fibrovascular bundles but no rind. In feeding trials it was found that the fibre content from the fibrovascular bundles did limit feed intake in some monogastric animals.

The present invention is directed to a novel process for the solid phase fractionation of sugar cane which, at least in preferred embodiments, overcomes a substantial number of the problems encountered with all three of the foregoing approaches to the utilization of sugar cane as a stockfeed.

DISCLOSURE OF THE INVENTION

The present invention consists in a process for the preparation of at least one fibrous and one non-fibrous fraction from sugar cane comprising the steps of (a) subjecting pieces of the sugar cane to a disintegrating force to cause a physical separation of the essentially fibrous sclerenchyma cells comprising part of the rind and the fibrovascular bundles of the sugar cane from the essentially non-fibrous parenchyma cells and their contents, while largely preserving the essentially fibrous nature of the sclerenchyma cells, (b) drying the sugar cane material. and (c) separating the sugar cane material into at least one fraction containing essentially fibrous materials and at least one fraction containing the essentially non-fibrous material.

In a further aspect the present invention consists in the dried essentially non-fibrous parenchyma cells from sugar cane largely freed from fibrous sclerenchyma cells.

In order for the difference between the process according to this invention and the third prior art method to be understood it is necessary to consider the structure of sugar cane. The sugar cane plant comprises the roots, the stalk and the leaves. For the present purpose the stalk is the most important as it constitutes the major part of the plant and contains the major part of the nutrient content of the plant. The stalk is generally cylindrical and comprises a series of nodes separated by elongate internodes. As is seen in a transverse section of an internode it is made up of essentially three components, viz:

(a) the rind which is made up of epidermal cells and several layers of thick walled lignified cells known as sclerenchyma cells, (b) ground tissue or parenchyma which comprises thin walled storage cells occupying a considerable part of the volume of the stalk, and (c) fibrovascular bundles scattered through the parenchyma and made up of various tissues including sclerenchyma cells, xylem, phloem and annular and spiral elements.

The rind and fibrovascular bundles in the stem comprise the fibre of bagasse. The parenchyma is soft and easily crushed, it is these cells which contain the major part of the plant juices from which sugar is recovered.

Any variety of sugar cane may be used in the process according to the present invention although it is obviously preferred to use varieties which have a high sugar content. It is not considered essential that the sugars be present as sucrose and therefore the cane may be harvested for the present purposes at any stage of its development. The cane may be burnt or unburnt and in stick or billet form. In some circumstances the cane may have been partially crushed to remove a proportion of the cane juice and the use of such partially crushed cane is encompassed within the present invention.

The third prior art method referred to in the foregoing discussions serves to separate the sugar cane into two solid fractions, the rind in one fraction and the parenchyma together with the fibrovascular bundles in the other. The process of the present invention is, by contrast, directed towards separating the parenchyma cells substantially completely from its attachment to the fibrous sclerenchyma cells, found in both the rind and the fibrovascular bundles. The present invention produces for the first time a high sugar, low fibre solid material which may be separated into a distinct and separate fraction from sugar cane which can be used as a feedstuff for both ruminant and monogastric animals. This material may also be used as a raw material for sugar production by the use of physical or chemical processes for the separation of the sugar from non-sugar solids. The fibrous fraction or fractions of the sugar cane may themselves be used as animal feedstuffs, or fuel, as building materials and the like.

In preferred embodiments the rind fraction and the fibrovascular fraction are also separated from one another and used separately, or in combination with the parenchyma, as animal foodstuffs or for other purposes.

The various sugar cane fractions obtained by the present invention will, when used as animal feedstuffs, normally be mixed with other feed additives such as minerals, protein supplements and vitamins. The feedstuffs may be fed to animals on their own or together with other conventional feedstuffs such as wheat, barley, oats, maize, sugar cane tops or leaves, sorghum, soy beans, meat meal or brewer's yeast, or it may be mixed with cane juice or molasses or other suitable feedstuffs.

The process according to the present invention involves the three steps of disintegrating the sugar cane, drying the sugar cane and separating the disintegrated sugar cane at least into fibrous and non-fibrous fractions. Any two or more of the three steps may be carried out simultaneously or they may be carried out separately. The separation step cannot be carried out after the disintegration step has been at least partially completed but otherwise the steps may be carried out in any desired order. It is also within the ambit of the invention to partially carry out one step, to then carry out a second step, and to then complete the first step. Thus one may partially dry the cane prior to at least partially disintegrating it and then subsequently complete the drying either before or after the separation step.

The disintegration step should break the sugar cane into pieces having a length substantially shorter than the internode length of particular variety of cane being processed. It is desirable, however, to avoid undue transverse severance of the cane as this will increase the production of short segments of otherwise fibrous materials. The disintegration step should also break the cane longitudinally and thus serve to release the parenchyma from the fibrous rind and fibrovascular bundles.

In preferred embodiments of the present invention the fibrous material resulting from the process will have an average length of over 2 cm, more preferably over 2.5 cm and most preferably over 3 cm. In some applications a fibre length of over 6 cm is desirable. If the fibrous material is too short it is difficult to separate the resultant dried material into the desired fractions.

The disintegration step is, in one embodiment of the invention, carried out at least partially in a pre-breaker prior to entering a suitable dryer. The pre-breaker may be any suitable machine which breaks up the sugar cane into pieces of a suitable size. In a preferred embodiment the pre-breaker comprises a shaft carrying a plurality of radially directed bosses, beaters or blades spaced apart along the shaft. The shaft rotates within a housing having a rib or other detent means disposed on its inside face adjacent the paths transversed by the bosses, beaters or blades. At least a part of the housing is provided with suitably sized holes to allow the broken sugar cane pieces to pass out of the pre-breaker. Many other equivalent forms of machinery could also be used to bring about this part of the disintegration step.

The disintegration step is, in another embodiment of the invention, carried out simultaneously with the drying step in a drying tower fitted at its lower end with a plurality of rotating blades which serve to throw the cane pieces upwardly into the drying tower and simultaneously sever it both transversely and longitudinally to assist in its disintegration. The disintegration appears to be substantially assisted by the heat in the drying tower. It should be recognized that many other arrangements of mechanical, thermal or chemical breaking, cutting or crushing machines may be adapted to carry out the same process of disintegration and drying. It is also possible to chop up the sugar cane mechanically and then to cause further disintegration using microwaves or indeed to use microwaves for an initial disintegration.

The drying is preferably conducted at a dryer temperature of from 60° to 600° C., more preferably 80° to 300° C. and most preferably 80° to 220° C. The temperature and the time in the dehydration should be so selected to avoid carbonization, charring or caramelization of the sugars while still reducing the moisture content to the desired extent. The moisture content of fresh cane is in the region of 50% to 70% by weight. It is desirable in the drying step to reduce this below 20% by weight, more preferably from 8% to 18% by weight and most preferably from 10% to 16% by weight. The moisture level is preferably reduced to a level where fermentation will not occur in the product such that it has a long and stable storage life and may be economically transported. It is however economically inappropriate to reduce the moisture content more than is necessary.

The drying process is preferably relatively brief and a residence time in the dryer of from 0.1 to 20 seconds is preferred, 0.1 to 4 seconds being particularly preferred. The cane material is preferably agitated within the dryer to facilitate the drying process. In particularly preferred embodiments of the invention the cane material is at least partially conveyed through the dryer using air currents, gravity or mechanical means.

If desired the foregoing rapid drying step may be followed by a second, longer, drying step at a lower temperature to further reduce the moisture level of the sugar cane material, or part of it. It has been found that if the initial drying and "thermal shock" is carried out at the lower end of the preferred temperature range a syrupy liquid may remain within some of the parenchyma cells when seen under the microscope. The slower drying step, at temperatures preferably below 120° C., and more preferably between 50° and 100° C., can be continued until such syrupy liquid is no longer present. In another embodiment of the invention the initially dried parenchyma cells containing syrupy liquid are not further dried but are mixed with other dry feed stuffs and/or pelletized.

It will be recognized that in order to get the correct dryer temperature it may be necessary to introduce into the dryer air or another gas at a temperature considerably higher than the desired dryer temperature to take account of heat losses in the dryer. In selecting the correct gas inlet temperature one must have regard to the amount of pre-preparation of the cane, i.e., ascertain the size and shape of the cane fragments; the air velocity and the residence time of the cane in the dryer.

The drying step, or part thereof, may if desired, be conducted at a pressure lower than ambient pressure. The use of a reduced dryer pressure will, of course, allow the use of lower drying temperatures.

It has been found that if the preferred temperature range for the dryer is exceeded there is a tendency for the parenchyma cells to violently rupture in the dryer which throws small droplets of cane juice into the gas stream. These droplets are thought to dry into sugar or char and form carbon and get carried away in the drying gas stream thereby reducing the sugar content of the final product which is undesirable. On the other hand the gas temperature should be such that there is a "thermal shock" effect which helps in the breaking apart of the parenchyma cells from the sclerenchyma cells. This "thermal shock" is thought to be induced by the rapid boiling or "flashing" of the contents of the parenchyma cells. Desirably the sugar resulting from the evaporation of the parenchyma contents should be deposited on or within the dried parenchyma cell wall so that it is not lost into the drying gas stream.

During the disintegration and drying steps the cane juice may form a sticky liquid exudate on the solid fractions of the sugar cane. The reference in this specification to solid phase fractionation of sugar cane is deemed to include this transient liquid phase which is not present in the finished product. It will be recognized however that the solid phase product may still have residue moisture.

The separation step may be carried out by sieving the fine parenchyma fraction from the fibrous fractions however other processes such as winnowing or other mechanical processes may be used for this purpose. The fibrous fraction may be separated into the rind fraction of larger heavier and generally harder pieces and the fibrovascular fraction of smaller, lighter and generally softer pieces by winnowing or some other like process. If desired the separation may be carried out to separate the rind fraction from the remaining material comprising the parenchyma and the fibrovascular bundles, if, for instance, the material was to be used as feedstuff for ruminant animals. In this case however it is to be recognized that while the parenchyma and the fibrovascular bundles are recovered together they are in fact separated from one another as distinct from the prior art "Comfith" material where they remain adhered to one another as a composite.

Hereinafter given by way of example only is a preferred embodiment of the present invention.

EXAMPLE 1

20 Kilograms of field burnt 2 year old sugar cane of the CP44-101 variety grown at Condong in New South Wales, Australia was passed through a pre-breaker and a KIX model SH2.5 dehydrator. The dehydrator was substantially as described in P.C.T. Patent Specification No. WO83/02495. "Dehydrator" the contents of which are incorporated herein by reference. The pre-breaker was a conventional piece of machinery comprising a rotatable shaft, a plurality of radially extruding steel bosses spaced apart along the shaft and a cylindrical housing surrounding the shaft and the blades. The inside surface of the housing carries a series of radially inwardly directed lugs each arranged to lie between the path of two adjacent blades as they are rotated. A section of the housing is provided with 12.5 cm × 12.5 cm square holes through which broken material may leave the pre-breaker and enter the dehydrator.

The cane billets of from 15 to 20 cm length were fed into the pre-breaker and then into the dehydrator. The dehydrator was run at 60% of maximum air flow with a dehydrator chamber inlet temperature of 370° C.

From 20 kg of fresh cane 7.65 kg of dried material was recovered. This dried material was separated by sieving into a first fraction being a fine, substantially powdery, product largely made up of dried parenchyma cells and their dried contents which constituted approximately 50% by weight of the dried matter; a second fraction being a soft fibrous product comprising fine fibres derived from the fibrovascular bundles of the cane and constituting approximately 15% by weight of the dried matter; and a third fraction being a hard fibrous product derived from the rind of the cane and constituting approximately 35% of the dried matter.

The three fractions obtained were analyzed as follows:

| Fraction | % dry matter | Nitrogen (gm/kg DM) | Neutral detergent fibre (gm/kg DM) |
|---|---|---|---|
| First fraction | 92.1% | 3.300 | 416 |
| Second fraction | 92.3% | 1.501 | 502 |
| Third fraction | 92.9% | 1.437 | 591 |

EXAMPLE 2

21 Kilograms of the cane of Example 1 was treated as described in that example except that the air flow was set at the maximum setting and the dehydrator chamber inlet temperature was 290° C.±20° C. On a first passage through the machine 8.25 kg of dried matter was obtained. When this was passed through the machine a second time 5.0 kg of product was obtained. The dried matter was separated by sieving and was found to have the same make-up as was found in Example 1.

EXAMPLE 3

Three fractions obtained from sugar cane grown in South East Queensland, Australia which had been processed in a manner similar to that described in Example 1 was tested to determine its digestability. Samples of each of the three fractions were placed in nylon bags and placed in the rumen of sheep fed a Pangola grass diet for 24 hours. The digestability results obtained were:

Fraction 1 comprising parenchyma material 80% by weight digestability.

Fraction 2 comprising fibrovascular bundles 71% by weight digestability.

Fraction 3 comprising rind 60% by weight digestability.

These three fractions were also analyzed for nitrogen content and were found to contain:

Fraction 1: 0.2% by weight nitrogen
Fraction 2: 0.1% by weight nitrogen
Fraction 3: 0.05% by weight nitrogen.

I claim:

1. A process for the separation of sugar cane into three fractions, one fraction of pieces containing substantially only fibrous sclerenchyma cells from the rind of the sugar cane, one fraction of pieces containing substantially only vascular bundles from the sugar cane, and one fraction of pieces containing substantially only non-fibrous parenchyma cells from the sugar cane, the process comprising the steps of:

(a) subjecting cut lengths of whole sugar cane to a disintegrating force in a disintegrating means to produce disintegrated sugar cane by inducing longitudinal and transverse severance of the lengths of sugar cane so as to cause a physical separation of the fibrous sclerenchyma cells and the vascular bundles from the non-fibrous parenchyma cells while preserving the fibrous nature of the sclerenchyma cells of the rind and of the vascular bundles and wherein substantially all of the pieces containing the sclerenchyma cells and the vascular bundles have a length greater than 2 cm;

(b) drying the disintegrated sugar cane by discharging the disintegrated sugar cane directly from the disintegrating means into a drying means containing a drying gas heated to a temperature of from 60° to 600° C., and maintaining and agitating the disintegrated sugar cane therein for an average residence time of from 0.1 to 20 second so that the moisture content of the disintegrated sugar cane is reduced to less than 20% by weight and the dried parenchyma cells deposit on or within the dried parenchyma cell walls substantially all of the dried sugar resulting from the evaporation of the contents of the natural parenchyma cells; and (c) after the disintegrated sugar cane has been dried, separating the disintegrated sugar cane into the three aforementioned fractions.

2. A process as claimed in claim 1 in which the steps of disintegrating the sugar cane and drying the disintegrated sugar cane are carried out substantially simultaneously.

3. A process as claimed in claim 2 in which the disintegrating step and drying step are carried out in a drying tower fitted at its lower end with a plurality of blades rotating about an axis substantially normal to a vertical axis of the drying tower which blades serve to throw the sugar cane upwardly into the drying tower and simultaneously sever it both transversely and longitudinally.

4. A process as claimed in claim 1, 2 or 3 in which the sugar cane is dried at a temperature of from 80° to 300° C.

5. A process as claimed in claim 4, wherein the temperature is from 80° to 220° C.

6. A process as claimed in claim 1 in which the sugar cane is dried to a moisture content of from 8 to 18% by weight.

7. A process as claimed in claim 6 in which the moisture content is from 10 to 16% by weight.

* * * * *